(12) United States Patent
Dichter

(10) Patent No.: US 6,663,128 B2
(45) Date of Patent: Dec. 16, 2003

(54) MAGNETIC TANK PAD

(76) Inventor: Benjamin Joseph Dichter, 6 Citation Drive, Toronto (CA), M3B 3B8

( * ) Notice: Subject to any disclaimer, the term of this patent is extended or adjusted under 35 U.S.C. 154(b) by 0 days.

(21) Appl. No.: 09/876,023

(22) Filed: Jun. 8, 2001

(65) Prior Publication Data

US 2002/0185322 A1 Dec. 12, 2002

(51) Int. Cl.[7] .................................................. B62J 1/00
(52) U.S. Cl. ................................ 280/288.4; 280/304.3
(58) Field of Search .......................... 280/288.4, 304.3, 280/304.4; 224/413, 562, 32 R

(56) References Cited

U.S. PATENT DOCUMENTS

| | | | | |
|---|---|---|---|---|
| 4,059,207 A | * | 11/1977 | Jackson et al. | 224/153 |
| 4,068,859 A | * | 1/1978 | Dittman | 224/413 |
| 4,469,256 A | * | 9/1984 | McEwen | 224/413 |
| 4,802,682 A | * | 2/1989 | Yasuji | 180/219 |
| 5,001,779 A | * | 3/1991 | Eggert et al. | 224/413 |
| 5,172,788 A | * | 12/1992 | Fujii et al. | 180/219 |
| 5,511,822 A | * | 4/1996 | Wolanski | 150/167 |
| 5,664,716 A | * | 9/1997 | Nuckolls | 190/110 |
| 5,897,040 A | * | 4/1999 | Ward | 224/183 |
| 6,062,601 A | * | 5/2000 | Willie et al. | 150/167 |

FOREIGN PATENT DOCUMENTS

| | | | | |
|---|---|---|---|---|
| DE | 29823838 U1 | * | 12/1999 | B62J/9/00 |
| JP | 08053086 A | * | 2/1996 | B62J/11/00 |

* cited by examiner

*Primary Examiner*—Lesley D. Morris
*Assistant Examiner*—Paul Royal, Jr.

(57) ABSTRACT

A vinyl pouch designed to house a foam cushion or padding intended specifically to mount on to a motorcycle gas tank. The method of mounting and the mounting points are disclosed. The cushion is wrapped in vinyl having side vinyl flaps attached at both the left and right ends containing magnets used for mounting purposes. The cushion is designed to make riding a motorcycle more comfortable by having this cushion padding between the rider's groin area and the metal surface of the gas tank. The side flaps of the cushion each contain heavy-duty square ceramic magnets that are flexible and wrap around the sides of the motorcycle gas tank. The side flaps contain cutouts with cargo net inserts for aesthetic appearances allowing the motorcycle paintwork to be seen through the cutouts.

12 Claims, 2 Drawing Sheets

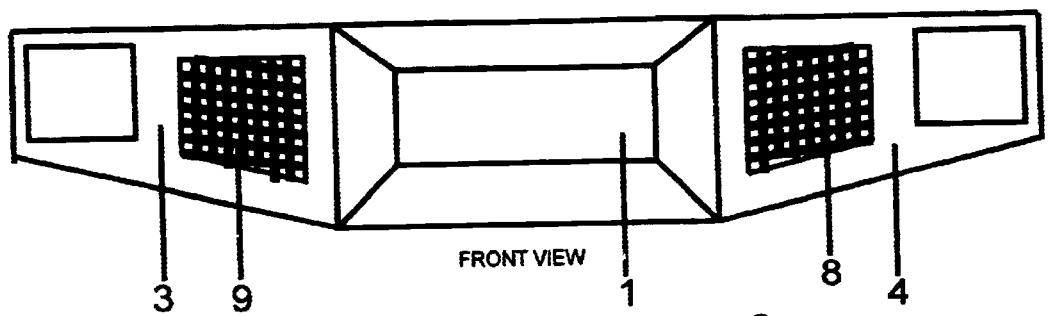
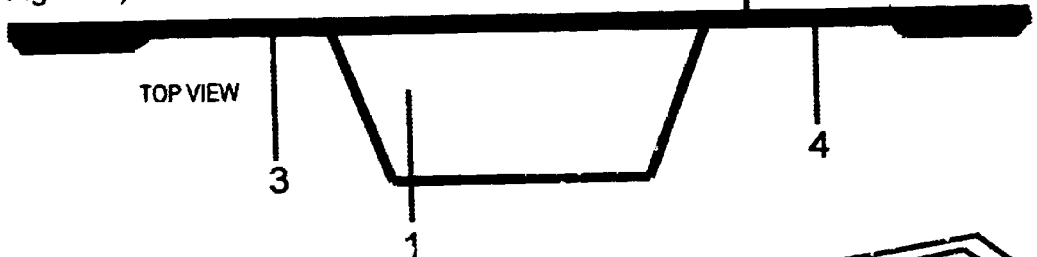
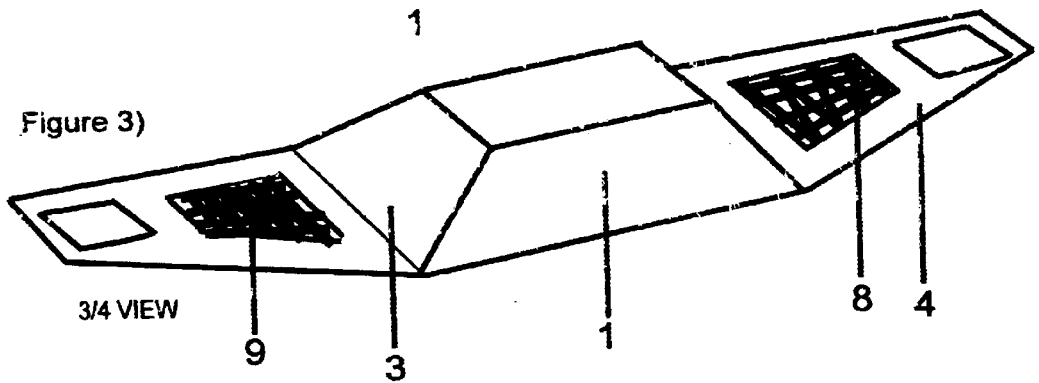
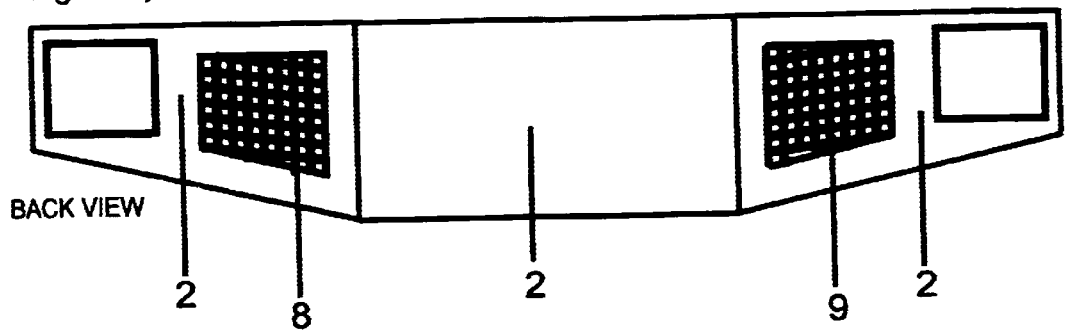

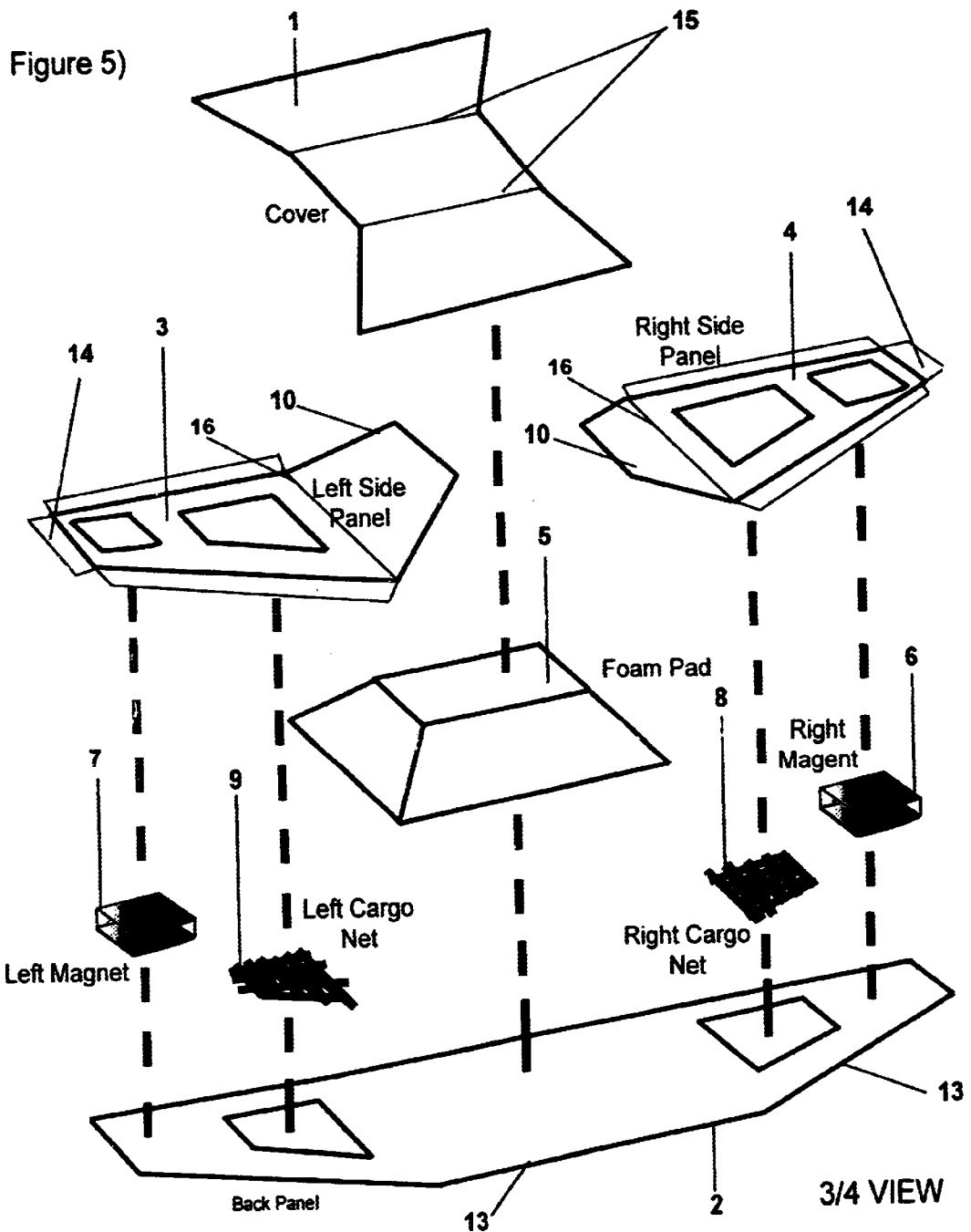

MAGNETIC TANK PAD

FIELD OF INVENTION

The invention relates to a protective padding pouch or cushion mounted to a motorcycle specifically for the purpose of a rider to rest his/hers groin area to make riding more comfortable.

BACKGROUND OF INVENTION

The present invention pertains specifically to all motorcycles and provides protection for riders that naturally slide forward on the seat into the gas tank. This sudden sliding forward motion is usually experienced when braking, riding over unavoidable potholes or when accompanied by a passenger during deceleration. Riders of high performance or sport motorcycles more often experience this painful effect.

There is no product on the market that is designed specifically to support and protect a motorcycle rider's groin when being pressed against the gas tank, which is magnetically mounted to the motorcycle. There are several products on the market that protect the gas tanks from being scratched by a motorcycle rider's gear. These products called tank guards or tank bra are either glued onto the gas tank or strapped into place via bungy cords. These products do not absorb the impact of the rider's groin with a thick foam pad or any soft impact absorbing material. They are solely for the protection of a motorcycle gas tank.

All motorcycle accessories that mount onto gas tanks adhere using either integrated bungee cords or epoxy adhesives. These products are designed to protect the gas tank from scratching or are designed as storage compartments. These products are sold to the public through motorcycle dealerships after they have gone through the industries distribution channels. The concept starts by recognizing that motorcycle dealerships and accessories shops can offer this new product to the public and that no such product is available to the public to date.

SUMMARY OF INVENTION

The present invention is a protective groin cushion designed to magnetically adhere to a motorcycle gas tank. The inventions measurements begin with a foam cushion 4½"×5¾"×2¼" stitched into a pouch having flexible vinyl flaps on either side. The flexible vinyl flaps are each 5 inches in length at the top 5½ inches in length at the bottom. The outer edge measures 3 inches in height while the inner edge, being stitched to the cushion cover is the same height as the cushion (4½ inches). At the 3 inch high outer edge of each flap a heavy-duty ceramic magnet measuring 1⅞ square by ⅜ inches, thick is placed. These magnets magnetically adhere to each the side of a motorcycle gas tank. On the flaps between the magnets and the cushion are two cut outs with cargo net inserts. These cuts outs and inserts measure 2¼ high on the outer edge and 3 inches high on the inside edge by 2 inches wide on the top and 2¼ inches wide on the bottom. These cut outs are for aesthetics appearance and are non-functioning.

The center cushion is the main functioning feature of the product. The 2 lbs. density industrial grade upholstery foam is cut to shape and tapered. The base of the foam measures 5¾ inches wide by 4½ inches tall. The foam core is tapered in from back to front to 2½ by 3¾ rectangle face. A logo can be embossed on the front piece of vinyl over the top of the cushion.

The purpose is to cushion a motorcycle rider's groin area as he/she naturally slides into the tank. This sliding effect is frequently experienced when a motorcycle rider decelerates, stops, hits unavoidable pot holes or when accompanied by a passenger. The Magnetic Tank Pad alleviates the problem by being specifically designed to mount on the optimum spot of a motorcycle gas tank, cushioning the rider when he/she slides into the tank.

The product is assembled from four pieces of vinyl cut to shape, one 2 lbs. industrial grade upholstery foam cushion cut to shape and tapered, two 2½ inch square ×¼ inch thick heavy duty ceramic magnets, two pieces of cut cargo net, all of which are sewn together.

The skin of the finished product is industrial strength fire retardant vinyl commonly used in fire fighting gear. The vinyl is the skin and the structure of the product as the product is stitched together on an industrial sewing machine using high strength polyester/cotton thread made for nylon and vinyl materials. The vinyl skin is first die cut into four specific shapes that determine the shape and size of the product. The four panels are cut into a large back panel the total width and shape of the product (16 inches wide ×4½ inches tall). The center front panel is embossed and wrapped around the front of the foam core to create the cushion. The side panels are stitched to the either side of the front embossed cushion. The cargo net is stitched into place and together form the shape of the front of the cushion. The back panel is then stitched to the assembled front panel. Before the final top stitch is made the foam core and ceramic magnets are interested into place and the final seem is stitched closed.

BRIEF DESCRIPTION OF DRAWINGS

The following drawings form the present specifications in full of the existing invention and demonstrate all aspects of the product construction and design.

FIG. 1 is a frontal view of the invention

FIG. 2 is a top view of the invention

FIG. 3 is a ¾ view of the product, as it would lay on a table

FIG. 4 is a back view the exact opposite of FIG. 1

FIG. 5 is all components and how they are placed to assemble the final product

DESCRIPTION OF ILLUSTRATIVE EMBODIMENTS INVENTION

The Magnetic Tank Pad is a pouch like cushion having two wide vinyl straps containing two concealed ceramic magnets on the ends of either strap. On both straps between the cushion and the magnet is a cutout or window in which cargo-net is stitched The product is designed specifically to rest on the motorcycle gas tank magnetically and remove quickly and store away when desired. As a result, installation of the product is simple. A rider simply has to ensure that the magnets are separated and hold the product keeping the flaps apart the logo is facing the back of the motorcycle.

Then, rest the cushion on the back of the motorcycle gas tank on the vertical slope in front of the seat. Once the product is in a comfortable position for the rider, gently lay the magnets on the side of the gas tank stretching the side flaps as far from the driver as possible. Since the adhesion is magnetic, it can be adjusted at the rider's discretion as often as he/she sees fit.

Manufacturing Process

All 4 vinyl panels are die cut to specific shapes and specifications

The top panel (1) is given two non functioning horizontal stitches; figure E (15)

Two side panels (3 & 4) and center top panel (1) are stitched (10) together to form one large top panel Cargo net edges are glued into place on back panel (2) using 3M SPRAY 77 adhesive Back panel and large top panel (1,3, & 4) is stitched (11) to back panel (2) only around edge of rhomboic cut outs Bottom of front panel (1,3 & 4) is folded around the back panel and stitched (13)

Outer edges of front panel are folded around the back panel and the edge is stitched (14)

Foam core (5) is inserted between the front and back panel in the center pouch.

Left and right magnets (6 & 7) are inserted between front and back panels and between far edges and rhomboic cut outs.

The remaining top is folded around the back panel and the final stitch (12) is made.

There are no other products of this kind in the motorcycle accessories market. The most similar products are not foam pads but a variety of other materials and composites.

Products such as Pro Grip™ are designed solely to protect the tank from being scratched by a rider's belt buckle or jacket zipper. Pro Grip™ is available as a plastic, carbon fiber or rubber and is glued onto the motorcycle gas tank. Tank Bra is another type product that straps on to a motorcycles gas tank. The products are designed to protect a motorcycle gas tank from being scratched and strap onto the gas tank via wrap around bungee cords.

Tank Bags are products designed to mount onto a gas tank via bungy straps and are designed as a soft storage compartment on the top of a motorcycle.

In contrast, the instant invention is made from die cut, industrial strength, waterproof and fire retardant vinyls, precut and tapered foam, die cut cargo-net and ceramic magnets. All of which is then hand sewn and glued together. Unlike Pro Grip™ tank bras and tank bags the instant invention fits all motorcycles having a metal gas tank.

DETAILED DESCRIPTION OF THE DRAWINGS

In the preferred embodiment of all components used to assemble the product refer to FIGS. 1–5. FIG. 1 illustrates the frontal view of the invention and what the rider looks at when setting the invention into place on a motorcycle gas tank. The left side panel 3 and right side panel 4 are both flexible and wrap around the sides of the gas tank. The squares on either side of the center cushion illustrate a slight bulge from the ceramic magnets, which are sewn underneath the vinyl and hold the invention in place on the motorcycle. In FIGS. 1–5 the cargo net cut outs illustrated by numbers 8 and 9 are inserted in holes in the front side panels and back panel allowing the colour of the motorcycle, the invention is placed on, to be seen.

FIG. 2 illustrates the top view of the invention. The cushion rests on the back portion of the product and sticks out 2¼ inches from the back. 2¼ inches is the depth of the foam core. The cushion on the motorcycle sits approximately 2½ inches from the tank and is dependant on the shape of the back portion of the tank.

FIG. 5 is the assembly of the invention. The first step is to stitch number (15) on to the top panel (1). These two straight stitches are only for aesthetic appearances and symmetry and are non-functioning. The next step is the sewing together of the left panel (3) top panel (1) and right panel (4). These three panels are attached together via a fold over double stitch (10) that comes together to make the front of the invention and are cut in away that, when stitched, follow the shape of the foam core. The back panel (2) is then attended to buy temporarily gluing the pre cut cargo net around the rhomboic cuts outs round the edge using a spray adhesive glue. When the glue is dry the entire front panel made up of panels (1,3 &4) and the back panel (2) are sewn together only around the edges of the rhomboic cut outs and cargo net. This lines up the front and back and keeps the cargo net in place. The thread used is a heavy-duty industrial cotton/polyester often used with leather, vinyl and other thick materials. Then the bottom of the front panel (1,3 & 4) is folded around the back panel (2) and stitched (11). The far left and far right edges are folded from the front panel (1,3, & 4) around the back panel (2) and stitched (14). The final few steps include fitting the foam core and magnets between the front and back panels and the final stitch (12) is made along the top of the invention.

I claim:

1. A flexible apparatus for mounting on a motorcycle gas tank to protect and shield a rider's groin area, said flexible apparatus comprising:

a tank pad, said pad including a foam cushion encased in vinyl, side panels extending from said cushion, and at least one magnet within said side panels.

2. The flexible apparatus of claim 1, wherein said cushion has a tapered square shape.

3. The flexible apparatus of claim 2, wherein said side panels extend outward from the left and right side of said cushion.

4. The flexible apparatus of claim 1, wherein said at least one magnet secures said tank pad to a metal gas tank.

5. The flexible apparatus of claim 2, wherein said at least one magnet secures said tank pad to a metal gas tank.

6. The flexible apparatus of claim 3, wherein said at least one magnet is secures said tank pad to a metal gas tank.

7. The flexible apparatus of claim 1, further comprising at least one cutout in said side panels, said at least one cutout positioned between said cushion and said at least one magnet.

8. The flexible apparatus of claim 5, further comprising netting at said at least one cutout.

9. The flexible apparatus of claim 1, wherein said side panels are made of fire retardant material.

10. The flexible apparatus of claim 1, wherein said side panels include stitches sewn using high strength thread.

11. The flexible apparatus of claim 1, wherein said at least one magnet is made of ceramic material.

12. The flexible apparatus of claim 1, wherein said at least one magnet includes two ceramic magnets positioned at distal ends of said side panels.

* * * * *